US006327590B1

United States Patent
Chidlovskii et al.

(10) Patent No.: US 6,327,590 B1
(45) Date of Patent: Dec. 4, 2001

(54) SYSTEM AND METHOD FOR COLLABORATIVE RANKING OF SEARCH RESULTS EMPLOYING USER AND GROUP PROFILES DERIVED FROM DOCUMENT COLLECTION CONTENT ANALYSIS

(75) Inventors: Boris Chidlovskii; Natalie S. Glance, both of Meylan; Antonietta Grasso, Grenoble, all of (FR)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/305,435

(22) Filed: May 5, 1999

(51) Int. Cl.[7] .................................................. G06F 17/30
(52) U.S. Cl. ............................................................ 707/5
(58) Field of Search .......................................... 707/5, 10, 3

(56) References Cited

U.S. PATENT DOCUMENTS

| | | | |
|---|---|---|---|
| 4,996,642 | 2/1991 | Hey ......................................... 364/419 |
| 5,704,017 | 12/1997 | Heckerman et al. .................... 395/61 |
| 5,724,567 | 3/1998 | Rose et al. ............................. 395/602 |
| 5,737,734 | * 4/1998 | Schultz ..................................... 707/5 |
| 5,794,237 | 8/1998 | Gore, Jr. .................................. 707/5 |
| 5,855,015 | * 12/1998 | Shoham .................................... 707/5 |
| 5,864,846 | * 1/1999 | Voorhees et al. ....................... 707/5 |
| 5,867,799 | * 2/1999 | Lang et al. ............................... 707/1 |
| 6,012,053 | * 1/2000 | Pant et al. ................................ 707/3 |

* cited by examiner

Primary Examiner—John Breene
Assistant Examiner—Susan S. Rayyan
(74) Attorney, Agent, or Firm—Jeannette M. Walder

(57) ABSTRACT

A system for ranking search results obtained from an information retrieval system includes a search pre-processor, a search engine and a search post-processor. The search pre-processor determines the context of the search query by comparing the terms in the search query with a predetermined user context profile. Preferably, the context profile is a user profile or a community profile, which includes a set of terms which have been rated by the user, community, or a recommender system. The search engine generates a search result comprising at least one item obtained from the information retrieval system. The search post-processor ranks each item returned in the search result in accordance with the context of the search query.

11 Claims, 2 Drawing Sheets

SYSTEM AND METHOD FOR COLLABORATIVE RANKING OF SEARCH RESULTS EMPLOYING USER AND GROUP PROFILES DERIVED FROM DOCUMENT COLLECTION CONTENT ANALYSIS

FIELD OF THE INVENTION

This invention relates generally to information retrieval systems and more particularly, to a system and method of collaboratively ranking results returned from a search engine using user and group profiles.

BACKGROUND OF THE INVENTION

The World Wide Web (the "web" or "WWW") is an architectural framework for accessing documents (or web pages) stored on a worldwide network of distributed servers called the Internet. Documents stored on the Internet are defined as web pages. The architectural framework of the web integrates web pages stored on the Internet using links. Web pages consist of elements that may include text, graphics, images, video and audio. A web page, which points to the location of another web page, is said to be linked to that other web page. Links that are set forth in a web page usually take the form of a text fragment or an image. A user follows a link by selecting it.

With the advent of networking technology and the World Wide Web, the ability to access information from external sources has greatly increased. Various search engines enable a user to submit a query, which returns a collection of items or documents. A well-crafted query may return a manageable set of documents, typically from 30 to 50 documents. A less narrow query may return over 1000 documents. An overly narrow query may return no documents (in which case no ranking is required). Various techniques are available for assisting the user in refining or narrowing his/her search query. However, once the search result has been properly narrowed significant problem in information retrieval is how to rank the results returned by the search engine or the combination of search engines.

For individual search engines, there are many different techniques for ranking results, ranging from counting the frequency of the appearance of the various search terms in the search query to calculating vector similarities between a search term vector and each returned document vector. In a networked environment such as the World Wide Web, meta-searchers access different and often heterogeneous search engines and face the additional difficulty of combining the ranking information returned by the individual engines. Meta-searcher is a Web information retrieval system aimed at searching answers to a user's query in the heterogeneous information providers distribute over the Web. When a meta-searcher receives responses (usually in the form of HTML files) from the information providers, a special component of a meta-searcher called a wrapper, process the responses to answer the original query. Since many search engines, including meta-searchers, hide the mechanism used for document ranking, the problem of merging search results is compounded. A problem common to both individual search engines and meta-search engines is that these approaches ignore, or knowing nothing about, the user conducting the search, or the user's context for conducting the search.

Relevance feedback is one approach that elicits information about the user and his/her search context. Relevance feedback techniques re-rank the search results by using user feedback to recalculate the relative importance of key words in the query. While powerful from a technical point of view, relevance feedback approaches suffer from user interface issues. The relevance information required is often difficult to elicit successfully from users during the search process. U.S. Pat. No. 4,996,642 to Hey, System and Method for Recommending Items, describes a system for providing recommendations to users based on others items previously sampled by the user and the availability of the items.

Knowledge Pump, a Xerox system, provides community-based recommendations by initially allowing users to identify their interests and "experts" in the areas of those interests. Knowledge Pump is then able to "push" relevant information to the users based on those preferences. This is accomplished by monitoring network traffic to create profiles of the users, including their interests and "communities of practice," thus refining the community specifications. However, monitored or automatically created profiles for establishing context may not accurately reflect the user's context at all times.

There is a need for a system and method of ranking search results which does not require user solicited relevance information. There is also a need for a system of ranking search results which takes into account a predetermined user context profile. There is also a need for a system and method of ranking search results which ranks results based on a user selected context. There is also a need for a system and method of ranking search results which takes into account a group or community to which the user belongs. There is a further need for a system and method of creating a user and community profile for ranking search results.

SUMMARY OF THE INVENTION

A system for ranking search results obtained from an information retrieval system, according to the invention, includes a search pre-processor, a search engine and a search post-processor. The search preprocessor, responsive to a search query, determines the context of the search query by comparing the terms in the search query with a predetermined user context profile. The user's context profile may include, for example, the user's identity, the community or set of communities applicable to the search, and the point of view the user wishes to adopt (e.g., that of a domain expert) for the search. Preferably, the context profile is a user profile or a community profile, which includes a hierarchical set of terms that have been rated by the user or community. Also, a recommender system may be used to generate the user or community context profile.

The search engine, responsive to the search query, generates a search result comprising at least one item obtained from the information retrieval system. (If no items are returned, such as when the search is overly narrow, no ranking is required.) Generally, a great number of items will be generated, which the search engine will provide in its own predetermined form of hierarchical valuation. The search post-processor, responsive to a non-empty search result, ranks each item returned in the search result in accordance with the context of the search query. The ranked results may then be provided or displayed in any normal fashion, such as on a computer display or printed out. If more than one search engine is used, each search engine returns its own list of search results. The post-search processor then ranks all items returned, regardless of search engine, in accordance with the context of the search query.

A method of ranking search results obtained from an information retrieval system, according to the invention, includes providing a predetermined user context profile, generating a search query, and applying the context profile to the search query to generate a context of the search query. A search is then performed based on the search query, which includes at least one item obtained from the information retrieval system. The search results are then ranked in accordance with the context of the search query.

The system and method according to the invention couples a predetermined user context profile (e.g., user profiling, community profiling or recommender profiling) with the search process. By coupling context profiling with the search process, search results are no longer an isolated event, but are ranked within the context of a particular user or community or recommender system point of view. Depending on the user's context for the search, a different predetermined context profile may be selected, thus customizing the ranking of each particular search.

The user and community profiles are built by analyzing document collections put together by the users and the communities to which the users belong. If any of the retrieved search results are considered relevant to the user or the community, they can be used to tune or modify the particular user or community profile by re-weighting the profile terms.

User and community profiling is particularly useful in the invention. First, the post-processor uses a particular context profile (either the user's profile, the community's profile or another user's profile—such as a known expert in a domain outside the user's expertise) to rank the results of a search query. Preferably, a user profile is build from a user selecting a particular document collection and ranking or rating the various terms within the document collection. The user profile becomes the document collection with rating information attached to each document. A user can have more than one user context profile, or use another user's context profile in order to rank the search results most expeditiously according to a particular point of view. The ranked search results can be used to update the user profile based on new submissions or documents produced in the search and ranked using the user's context. This approach is similar to relevance feedback.

Similarly, a community (i.e., a group of users having similar interests) profile can be built by categorizing the documents in a document collection into the communities (when such a construct exists in the document collection) and then ranking the various documents according to the particular users belonging to the community. A user's ability to rank documents within the community will vary according to his/her levels of expertise. Various methods to approximate a user's level of expertise within a community can be used (e.g., by agreement, by statistics, etc.).

The system of the invention provides an architecture that allows these methods to work together in support of community-based relevance feedback. The system and method of the invention provide the ability to rank results returned across multiple search engines and the ability to take into account the user's context through use of user, community or expert user profiles.

DETAILED DESCRIPTION OF THE PREFERRED EMBODIMENTS

Figure 1:
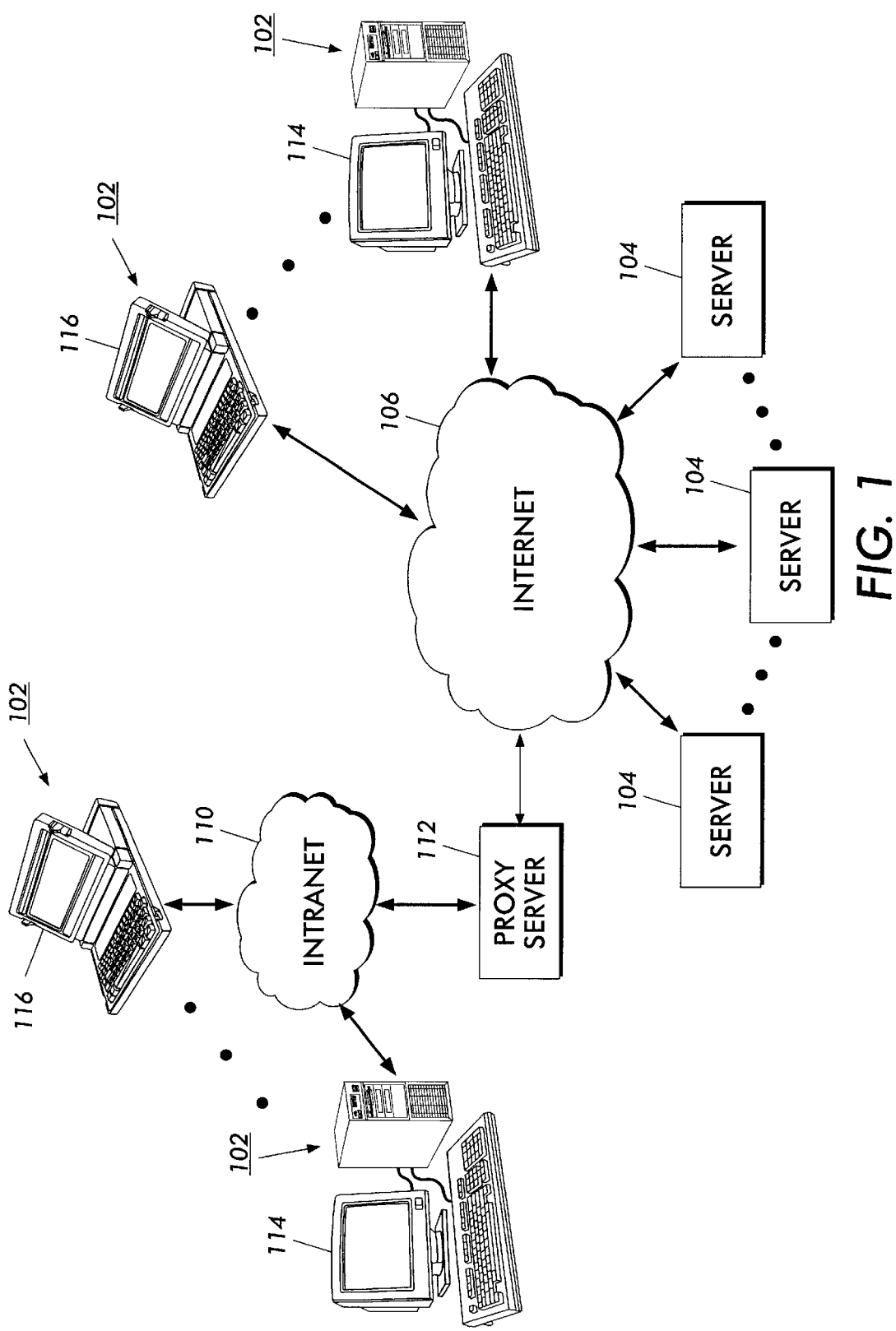
FIG. 1 illustrates an example of a distributed operating environment for performing the present invention.

Referring now to the figures, FIG. 1 illustrates an example of a distributed operating environment for performing the present invention. In the distributed operating environment illustrated in FIG. 1, client computers 102, request searches, communicate with other client computers and retrieve documents (i.e., web pages) stored on servers 104 for either viewing, storing, or printing. The client computers 102 are coupled to the servers 104 through Internet 106. Some client computers 102, which are located on an Intranet 110, communicate indirectly with servers 104 located on the Internet 106 through a proxy server 112. The client computers 102 may consist of either workstations 114 or laptops 116. Alternatively, the client computers 102 may request searches, communicate with other client computers and retrieve documents (i.e., web pages) stored on Intranet servers such as proxy server 112 for either viewing, storing, or printing.

Figure 2:
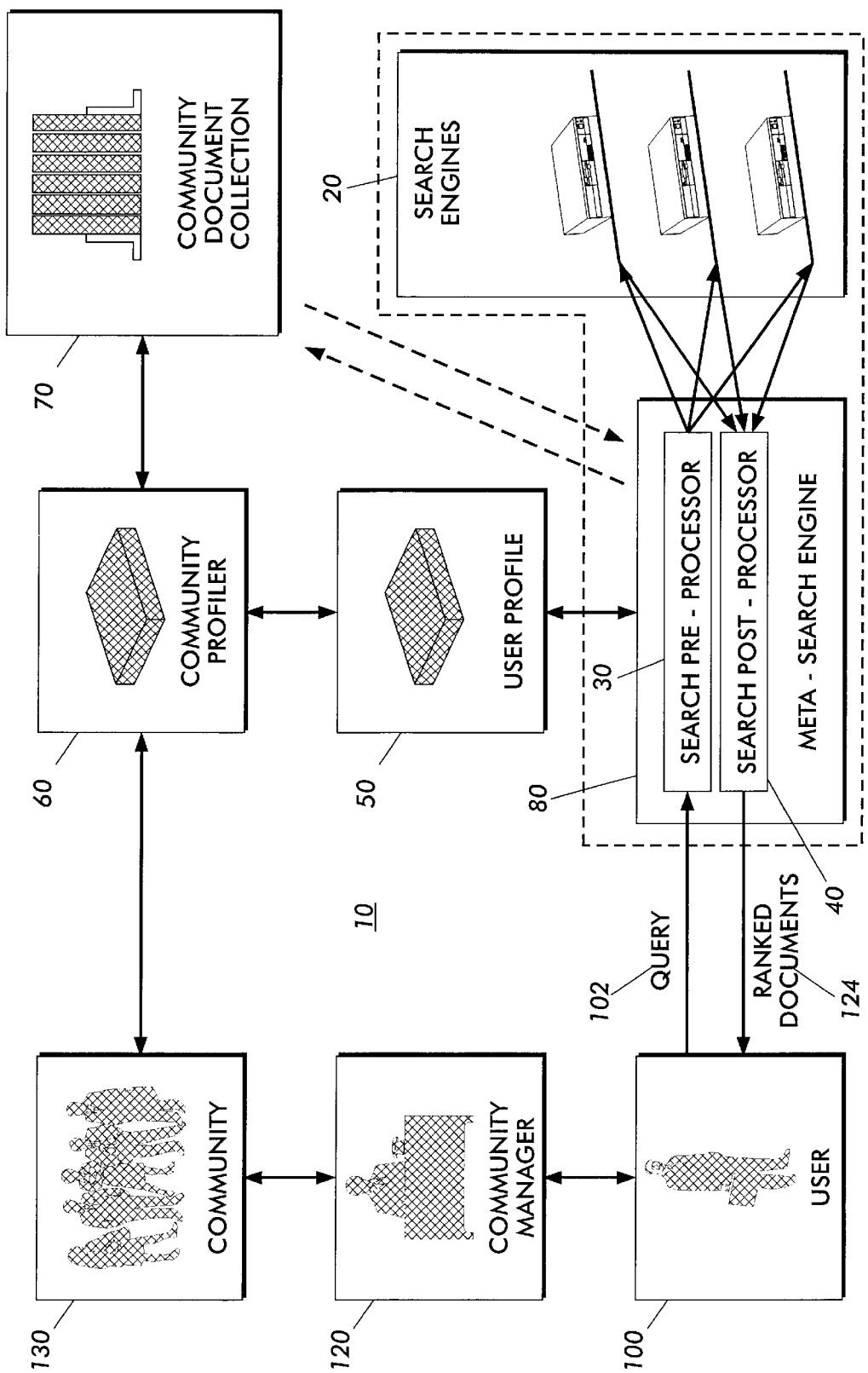
FIG. 2 is a block diagram of a system for ranking search results obtained from an information retrieval system in accordance with a predetermined context profile.

Referring to FIG. 2, a system for ranking search results obtained from an information retrieval system according to a predetermined user context profile is generally shown therein and referred to by numeral 10. System 10 includes search pre-processor 30, which takes a query 102 from a user 100 and applies a predetermined user context profile to determine the context of the search query. The user context profile may be a user profile generated by user profiler 50 or a community profile generated by a community profiler 60. Results from the search query, which generally include a plurality of hierarchically-ranked search results based on the query, are returned by the various search engines 20, or meta-search engine 80 by searching an information retrieval system (such as the Internet). These search results are then ranked by the search post-processor 40 and provided to the user in the form of ranked documents 124.

Community profiler 60 ranks community document collection 70 in accordance with evaluations or rankings determined by the members of community 130. In some cases, community manager 120 may determine from time to time whether a particular user may join or continue to be a part of the community. User profiler 50 ranks a selected document collection (which may also be the community document collection 70) in accordance with evaluations or ratings by user 100.

The system may be extended to support community-based relevance feedback. In addition to the search pre-processor, one or more search engines or meta-search engines and search post-processor, the extended system may include one or more document collections with associated user, community/group, and rating attributes, a user profiler, a community profiler and a community manager. Additionally, the extended system may include wrappers that allow the profilers to extract document content (or document reference, such as its URL), user, community and rating information from the document collections and wrappers that allow the search pre-processor to submit queries to the search engine and the search post-processor to extract the results.

The document collection may be one (or a combination) of several different types: documents residing in a document management system or a file system or documents referenced by a recommender system. In each case, the document collection provides a specific methodology for associating content with users and potentially with communities of users. In each case, the document collection provides the basis for establishing the user context profile, in that the document collection and user ratings establish the environment or the interrelated conditions under which the user desires to rank search results.

Preferred document collections include those provided by community recommender systems which attach user identification, community categorizations and user ratings to the documents. Using document collections generated by community recommender systems allows use of the most sophisticated of the user and community profiling techniques described below. Preferably, a community-based relevance feedback system includes a recommender system as one of the document collections, or preferably as the principal one.

An important aspect of the system for ranking is the document collection used to generate the context profile. The document collection may include an application program interface (API) for allowing the profilers to query for all documents submitted and/or reviewed by a user (who may be associated with a particular community). If such an API is not provided, then a wrapper suitable for extracting the information may be used. A wrapper is a tool used by a meta-searcher that scans the HTML files returned by the search engine, drops the markup instructions and extracts the information related to the query. Then the wrapper takes the answers from the different providers, puts them in a new format and generates an HTML file that can be viewed by the user. The API or the wrapper generates "meta-data" which is used by the profilers to construct and to incrementally update the user and community profiles from the set of documents relevant to the user and in the context of the community. In the case of standard document collections, (such as file systems or document management systems), it is generally assumed that any document filed or stored by the user is relevant to the user. In the case of a recommender system, it is generally assumed that any document submitted or reviewed by a user with an average or higher rating is relevant.

The search engine may include an API for submitting a search and retrieving results. If not, a suitable wrapper may be used. The problem of query translation across multiple, heterogeneous search engines and databases and the extraction of the search results is well known. Thus, any commercially available translation and extraction product may be used. However, it should be noted that search engines do not necessarily cover the documents in the system's document collections, although overlap is always possible.

The search pre-processor determines the context of the user's search. The search pre-processor applies a predetermined context profile to search query. For example, the context profile may include the user's identity, the community or set of communities appropriate to the search, and the point of view the user wishes to adopt for the search, if any (such as that of another user or a domain expert). The context profile can be retrieved explicitly by asking the user to identify him/herself and by asking the user to select the appropriate community or communities and/or point of view. Context can also be determined (deduced) automatically by matching the query with a query memory associated with a community (if selected) or the collection of users using the system.

A preferred context profile is that of the user. The user profile is created or generated by the user profiler, which constructs a term-weight vector for each user which is extracted from the set of documents submitted and/or reviewed into each of the document collections to which the user participates. Matching a user across several different document collections is not always simple. One method of accomplishing this is to ask the user to provide his/her identifier (and password, if needed) for each document collection. If a user withholds some of this information, then his/her profile will be less complete than for other users who do not withhold this information. However, this is not always the case as a user may choose only to provide access to particular document collections deemed appropriate by the user. This problem only occurs is more than one document collection is used in the system, which is preferably the one provided by the community recommender system.

The term-weight vector or user profile $P^u$ is calculated in a standard way, although various linguistic-based enhancements are possible as noted below. For a user, u, the vector includes the set of terms $\{t_i\}$ with their weights $w^u_i$, $P^u = \{t_i, w^u_i\}$. If the term-weight vector is at least calculated in part from documents that have been evaluated (implicitly or explicitly rated) in some way by the user, then the ratings given to the documents can be used to bias the term-weight vector.

The user profiler may also calculate the profile of the user in the context of a community or a specific domain or domains. In this case, the user profiler would take into account only those documents submitted or reviewed by the user and classified (either by the user or automatically) into the domain. An added difficulty in this case is matching communities/domains across document collections. Again, if there is only a single document collection, the recommender system, this difficulty disappears. The user profiler provides an API that returns a term-weight vector in response to a user identification and possibly a community/domain identifier.

Similarly, the community profile $P^c$ is created or generated by a community profiler. The community profiler constructs a term-weight vector for each community, which is extracted from the set of documents classified into a community within each of the document collections. The term-weight vector for the community is determined in a way analogous to that employed for users. The community vector contains the set of terms $\{t_i\}$ with their weights $w^c$, $P^c = \{t_i, w^c_i\}$. The weight of each term is calculated from the weights $w^u_i$ of the individual community members (users). Since the contributions of the members are frequently much different from one another, the community profile can be biased to weigh more heavily the contribution of "experts" in the community (special users). Experts are those community members whose recommendations are most frequently followed by the whole community. Formally, each member u in the community is assigned a weight $\alpha_u$. Experts have the highest $\alpha_u$ and for the whole community:

$$\Sigma_u \alpha_u = 1.$$

The individual $\alpha_u$ must be re-normalized whenever a user enters or leaves the community. Then, the weight of term $t_i$ in the community profile is evaluated as:

$$w^c_i = \Sigma_u \alpha_u w^u_i,$$

where $w^u_i$ is the weight of $t_i$ in the profile of user u. Beyond the community and personal (user) profile, the user can request the profile of the community expert(s), which contains weight $w^{exp}_i$ for each profile term $t_i$. The community profiler provides an API that returns a term-weight vector in response to a community identifier.

When registering a new user u to community, the initial user profile $P^u = (t_i, w_i)$ can be one of the following options: the community profile $(t_i, w_i)$; a list of user defined keywords $t_i$ (the weights $w_i$ are equal or induced from community profile); or empty. Any document reviewed or submitted by the user changes her/his profile as follows.

If (a new) document D is submitted, all terms and their associated weights are extracted from the document. k top-weighted terms are then selected such that a document profile is created: $D=(t'_i, w'_i)$, for $i=1, \ldots, k$, where $k$ is a system/application-dependent constant. Each document D reviewed and in the document collection has its own profile $D=(t'_i, w'_i)$. Otherwise, for a reviewed document, its profile $D=(t'_i, w'_i)$ is retrieved from the repository where it is stored along with the document.

The current user profile vector $P^u=(t_i, w_i)$ and new document profile $D=(t'_i, w'_i)$, are used as follows to update the user profile. For each term in set $\{t_i \cup t'_i\}$, we evaluate $w_i^{new} = \gamma \times w_i + (1-\gamma) \times w'_i$, where $\gamma$ is a "profile conservativeness" constant, $0 < \gamma < 1$. The closer $\gamma$ to 1, the slower the profile changes with new submissions. Practical values of $\gamma$ are in range [0.5,0.95] and can depend on the number of user submissions (over last m days).

Only the k top-weighted terms $t_i^{new}$ are chosen for the new user profile $P^u$ and their weights get normalized: $\Sigma w_i^{new} = 1$.

When creating a community, the community administrator (which can be a human or a software program) can use for the initial community profile $P^c=(t_i, w_i)$ one of the following options: process sample document(s) relevant to the community and extract terms and weights as with a user submission described above; use a list of community keywords $t_i$ given by administrator; or leave it empty. Any document reviewed or submitted by a community member changes the member profile. Beyond the member profiles, the community profiler maintains values of contribution $\alpha_u$ for each community member u.

For user u in the community, its contribution $\alpha_u$ can be evaluated as $v \cdot r_u / f_u$, where $r_u$ is a number of documents submitted by the user (over the last m days) and $f_u$ is the number of community users that followed those recommendations. v is a customization coefficient; it may favor a user with numerous, but moderate, recommendations rather than a user with one but a popular recommendation. The user with the highest value $\alpha_u$ is called the community expert and his/her profile can be used as an expert profile $P^{exp}$ by other users for re-ranking the search results. Values $\alpha_u$ are kept normalized such that $\Sigma \alpha_u = 1$. Optionally, experts can be chosen or assigned by community members without statistical evaluation.

For all members of the community, their profiles $P^u=(t_i^u, w_i^u)$ and their contributions $\alpha_u$ are used for updating the community profile. For each term $t_i$ in $$\left\{ \bigcup_u t_i^u \right\},$$

its weight is $$w_i^c = \sum_u a_u \times w_i^u.$$

The community profile can keep all terms from its members' profiles or only the k top-weighted terms; in either case, their weights are kept normalized: $\Sigma w_i^c = 1$.

The update of the community profile $P^c$ is performed preferably when a minimally required number of user profile changes have occurred. The community profile update is processor time-consuming; thus it is preferably to update the profile off-line.

In a preferred embodiment, the system according to the invention incorporates a recommender system. In addition to the storing of document profiles, user profiles community profiles and expert profiles, a recommender system would also include or provide tools for profile retrieval and profile updates.

Matching community definitions across document collections and maintaining a coherent list of communities and users participating in those communities is frequently difficult. If a community recommender system exists within the system, then its list of communities is a likely candidate for adoption for the community relevance feedback system. Alternatively, an administrator of the system could be responsible for matching groups or collections in other document collections with the community list. The task of constructing such a list from scratch would fall to the administrator in the absence of such a list. It is also possible to create automatic methods of performing the matching, although this may possibly reduce the accuracy of the community profiles. It is possible that the way in which the community list is constructed and matched across collections that the end result will be that the community profile is entirely determined from the data in the community recommender system, if such exists, or other document collection with a notion of the community.

It should be noted that a community profile is not required in order to practice the system and method of the invention. In some instances, it may be appropriate to take into account only the user's context, in the absence of the community, although such a system will be more difficult to accept and add new users.

A method of ranking search results obtained from an information retrieval system using a predetermined user context profile would include the following steps. Before a user starts formulating queries, because of the greater benefits available from a recommender system, the user is assumed to have registered with a recommender system. This permits the system to upload the user profile, community profile and/or expert profiles chosen by the users for search result ranking and profile re-weighting.

Once a user has formulated a query, the search preprocessor takes the query and processes the keywords in the query to a query profile $P^q=(t_i^q, w_i^q)$. This profile is used by the search post-processor later.

When the query is submitted to a search engine and the search result returns, the user sees the documents determined from the search query, listed or ranked in accordance with the algorithm provided by the particular search engine(s), if any. Since this ranking will likely not rank the results within the context desired by the user, the user can request re-ranking. Alternatively, the re-ranking by the search post-processor can be automatic.

The search post-processor takes as input the list of search results returned by the search engines. It has two preferred ways to evaluate the relative rank of the documents. One is by matching the document or its pointer (e.g., its URL) to one already existing in one of the document collections. For example, if the document has been rated by a community recommender system connected to the system within the appropriate community context, then this rating is given a high weight in determining the relative rank of the result.

The second preferred means of evaluating the relative ranking of documents is by using the profile term-weight vectors as a source of relevance feedback. Depending on the context (i.e., user, community or expert), the appropriate profile is requested.

Each document in the search result is downloaded, i.e., the full contents of each document is downloaded for term extraction. The extraction is similar to that for submitted documents when a user context profile is being created from a document collection as described above. The search post-processor returns a document profile $P^d=(^d_i, w^d_i)$ for each document d that contains k' top-weighted terms. Generally, a document in a search response is not considered as important as a submitted document in the document collection, thus the number k' of terms chosen for the search returned document profile may be less than that for a submitted document. If a document in the search result is already in the document collection, its profile is not extracted from the document but is up-loaded from the document storage.

Once a profile $P^d=(t^d_i, w^d_i)$ is obtained for each document d in the search response, the relevance (or ranking) of document d with respect to the chosen user/community/ expert profile is obtained by the formula:

$$relevance(d) = \frac{\sum_i w^d_i \cdot w^{prof}_i \cdot w^q_i}{\sqrt{\sum_i (w^{prof}_i \cdot w^d_i)^2}},$$

where $w^{prof}_i$ are term weights in the selected user, community, or expert profile. Then, documents are sorted based on their calculated rank values and presented to user.

Since the profile-based document re-ranking takes some time (needed for the documents down-loading, term extraction and rank calculation), the user may request for re-ranking, switch to other activity (or continue search) and return back to re-ranked results later. Alternatively, the user may request persistent queries, when user queries are executed off-line.

Note that the term weights $w^d_i$ are evaluated from the document d content only. Since a response can actually be a brief description of an original document, the term weights $w^d_i$ in this case may be quite different from the term weights $w^d_i$ in the case when the full document is available. Although the relevance ranking is then biased by the profile (through the term $w^{prof}_i$), there is a standard tradeoff between the length of the response documents and the quality of the ranking: the longer the document, the more precise the ranking (and the longer it takes to perform the ranking). After each document in the search result is ranked, the results are displayed in ranked order to the user.

Either kind of user search (with or without re-ranking) can lead to finding documents relevant to the community. Such documents submitted by the user after the search may be used to change or modify the user profile and consequently the community profile, as discussed above.

Not all search engines are necessarily external to the search. An internal document collection can also be searched with a query. The post-processing in this case is simpler. Indeed, the term frequency vector for a document can be extracted a prior, stored along with the document in the collection and reused in the relevance ranking each time the document fits a query, thus reducing the ranking time.

If a user provides a positive feedback to the search result or documents retrieved over the process, the search results can be included in the document collection like any other recommendation. Additionally, the search results can be used to modify the user profile by re-weighting term weights. In such a case, the query terms and/or most frequent terms in the response form a set {Rel} of relevant terms. Using this set, the standard Rocchio formula for relevance feedback can be used. The main difference between the approach described herein and standard relevance feedback is that the approach of the invention does not take into account non-relevant terms since this approach does not have a reliable way of extracting this kind of information from both document collections and search results. As a result of re-weighting, the relevant terms from {Rel} have their weights increased in the user profile.

The search post-processor generally requires textual content in order to evaluate the comparative relevance of the returned items in the context of a given user or community profile. This means downloading either an abstract (if available) or the entire document. The entire process could become quite lengthy especially if the number of documents returned by the query is large. A first step of prefiltering may be necessary in order to prune the list to a manageable number. However, while the time cost is high, it should be remembered that the time cost to the user of evaluating the returned documents him/herself is even higher. In many cases, users may be willing to turn collaborative ranking on, return to other work at hand, and wait until an alert indicating the collaborative ranking process has terminated. As a further incentive to use the collaborative ranking feature, the items downloaded in the process can be cached locally, so that subsequent browsing by the user will be much less time-consuming.

Document content comes in many formats. In order to operate across as many formats as possible, the search post-processor will need to be able to connect to other modules that transform content format into the search format. Preferably, all formats will be transformed into ASCII format. Some documents may fall outside the system's ability to rank them. The system will need to distinguish these from those documents that are ranked in a way meaningful to the user.

It will be appreciated that the present invention may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A system for ranking search results obtained from an information retrieval system, comprising:

a document collection comprising a set of documents associated with a user u;

a user profiler for constructing a user profile $P^u=(t_i, w^u_i)$ comprising a set of terms $\{t_i\}$ extracted from each document in the document collection with their weights $w^u_i$;

a search pre-processor, responsive to a search query q, for determining a search query profile $P^q=(t^q_i, w^q_i)$ in accordance with the user profile, wherein $t^q_i$ comprise the query terms having term weight, $w^q_i$;

a search engine, responsive to the search query, for generating a search result comprising at least one document obtained from the information retrieval system; and a search post-processor, for each document d returned in response to the search query q, for generating a document profile, $P^d=(t^d_i, w^d_i)$ and for evaluating the search document rank in accordance with:

$$relevance_{q,d} = \frac{\sum_i w_i^d \times w_i^u \cdot w_i^q}{w_d}$$

where $w^d_i$ is the weight of term t in the response document d, $w^u_i$ is the weight of term t in the user context profile, $w^q_i$ is the weight of the term t in the query q, and $w_d$ is the vector length "projected" on the context profile and evaluated as $$w_d = \sqrt{\sum_t (w_i^u w_i^d)^2}.$$

2. The system of claim 1, wherein the user is a member of a community.

3. The system of claim 1, wherein the user is an expert member of a community.

4. The system of claim 1, wherein the search post-processor, for comparing each search document with the documents in the document collection and, responsive to a match, for assigning a relevance thereto.

5. A system for ranking search results obtained from an information retrieval system, comprising
   a search pre-processor, responsive to a search query, for determining a context of the search query in accordance with a predetermined user context profile;
   a search engine, responsive to the search query, for generating a search result comprising at least one item obtained from the information retrieval system; and
   a search post-processor, responsive to the search result, for ranking the item in accordance with the context of the search query;
   a context profiler for generating a context profile; and
   a document collection comprising a set of documents;
   wherein the context profiler comprises a community profiler for constructing a term-weight vector for the community, the term-weight vector being extracted from each document in the document collection and the community comprising a plurality of users u;
   wherein the community profile $P^c=(t_i, w^c_i)$ comprises the set of terms $\{t_i\}$ with their weights $w^c_i$ for each of the individual users u in the community;
   wherein each member u in the community is assigned a weight $\alpha_u$ and for the whole community: $\Sigma_u \alpha_u = 1$.

6. The system of claim 5, wherein the weight of term $t_i$ in the community profile is evaluated as: $w^c_i = \Sigma_u \alpha_u w^u_i$.

7. The system of claim 5, wherein at least one user of the community is an expert having a weight $w^{exp}_i$ for each profile term $t_i$.

8. A system for ranking search results obtained from an information retrieval system, comprising:
   a search pre-processor, responsive to a search query, for determining a context of the search query in accordance with a predetermined user context profile;
   wherein the predetermined user context profile comprises a community profile, $P^c=(t_i, w^c_i)$ where $w^c_i = \Sigma_u \alpha_u w^u_i$, is the weight of $t_i$ in a profile of user u in the community and $\alpha_u$ is the weight of each user in the community;
   wherein the search pre-processor determines a profile of the query $P^q=(t^q_i, w^q_i)$ in accordance with the predetermined user profile, wherein $t^q_i$ comprise the query terms having term weight, $w^q_i$;
   a search engine, responsive to the search query, for generating a search result comprising at least one item obtained from the information retrieval system; and
   a search post-processor, responsive to the search result, for ranking the item in accordance with the context of the search query;
   wherein the search post-processor evaluates each item d in the search result and generates a document profile $P^d=(t^d_i, w^d_i)$ for each item d, where $t^d_i$ is the profile term and $w^d_i$ the weight of each term.

9. The system of claim 8, wherein the community profile includes an expert having a user profile, which contains weight $w^{exp}_i$ for each profile term $t_i$.

10. The system of claim 9, wherein the search post-processor determines
the relevance of each item d in the search result in accordance with:

$$relevance_{q,d} = \frac{\sum_i w_i^d \times w_i^{exp} \cdot w_i^q}{w_d}$$

where $w^q_i$ is the weight of the term t in a query q, and $w_d$ is the vector length "projected" on the context profile and evaluated as $$w_d = \sqrt{\sum_t (w_i^{exp} w_i^d)^2}.$$

11. A method of creating a user context profile for use in ranking search results obtained from an information retrieval system, comprising:
    providing a document collection comprising a plurality of relevant documents;
    assigning a rating to each of the documents in the document collection to generate a document profile $P^d=(t^d_i, w^d_i)$ for each document in the collection;
    constructing a weight-term vector, wherein the weight-term vector includes a portion of the set of terms $\{t^d_i\}$ with their weights $w^d_i$ to form a user profile $P^u=(t_i, w^u_i)$;
    for each document d returned in response to a search query q, generating a document profile, $P^d=(t^d_i, w^d_i)$; and
    evaluating the search document rank in accordance with:

$$relevance_{q,d} = \frac{\sum_i w_i^d \times w_i^u \cdot w_i^q}{w_d}$$

where $w^d_i$ is the weight of term t in the response document d, $w^u_i$ is the weight of term t in the user context profile, $w^q_i$ is the weight of the term t in the query q, and $w_d$ is the vector length "projected" on the context profile and evaluated as $$w_d = \sqrt{\sum_t (w_i^u w_i^d)^2} \text{; and}$$

and
    updating the user context profile using the highest ranked item returned from the search query.

* * * * *